United States Patent [19]

Brewer

[11] Patent Number: 5,590,838
[45] Date of Patent: Jan. 7, 1997

[54] APPARATUS AND METHOD FOR REDUCING VEHICLE TIRES TO PARTICLES

[75] Inventor: John C. Brewer, Salt Lake City, Utah

[73] Assignee: Garb Oil & Power Corporation, Salt Lake City, Utah

[21] Appl. No.: 122,000

[22] Filed: Sep. 13, 1993

Related U.S. Application Data

[63] Continuation-in-part of Ser. No. 909,038, Jul. 6, 1992, Pat. No. 5,299,748.

[51] Int. Cl.$^6$ ........................................................ B02C 19/12
[52] U.S. Cl. ........................... 241/23; 241/279; 241/280; 241/DIG. 31; 241/DIG. 37
[58] Field of Search .......................... 241/23, 279, 280, 241/DIG. 37, DIG.31; 157/13, 16; 83/951

[56] References Cited

U.S. PATENT DOCUMENTS

| | | | |
|---|---|---|---|
| 2,937,676 | 5/1960 | Smyser | 157/13 |
| 3,578,252 | 5/1971 | Brewer | 241/141 |
| 3,614,969 | 10/1971 | Breiner | 157/16 |
| 3,693,894 | 9/1972 | Willette | 241/279 |
| 4,025,990 | 5/1977 | Lovette, Jr. | 241/14 |
| 4,813,614 | 3/1989 | Moore et al. | 241/23 |
| 5,299,748 | 4/1994 | Brewer | 241/279 |

FOREIGN PATENT DOCUMENTS

| | | | |
|---|---|---|---|
| 1675109 | 9/1991 | U.S.S.R. | 241/DIG. 37 |
| 8803866 | 6/1988 | WIPO | 157/13 |

*Primary Examiner*—John M. Husar
*Attorney, Agent, or Firm*—Mallinckrodt & Mallinckrodt

[57] ABSTRACT

Apparatus for reducing to particles tread portions and beaded side wall portions of vehicle tires, particularly extra large vehicle tires, or for preparing such vehicle tires for recapping, comprises a tire holder assembly, having a paired set of dual jacks carried by opposite ends, respectively, of elongate, rigid, tire clamping frames, and a rotary, cutter blade assembly made up of a side-by-side series of disks carrying cutter blades of chisel type offset from one another to provide a helically oriented series of such cutting blades. Opposite side and end members of each of the frames provide for clamping corresponding side wall beads of a received tire, while opposite ends of opposite end members of the respective frames, usually clamping corners thereof, span respective chords of the circumferences of corresponding beads of the tire. When the tire is to be recapped, arcuate attachments are secured to the mutually spaced, opposite, clamping corners of the ends of the frames that contact a corresponding tire bead. An optional but important feature of the invention is the progressive cutting of the tire in a cryogenic atmosphere which freezes exposed surfaces of the tire, and the mounting of a group of separate, residual, beaded side wall portions of sequentially cut tires in the tire holder assembly of the same apparatus for cutting such side wall portions down to the heavily reinforced beads thereof.

6 Claims, 14 Drawing Sheets

FIG. 21

APPARATUS AND METHOD FOR REDUCING VEHICLE TIRES TO PARTICLES

RELATED APPLICATION

The present application is a continuation-in-part of the correspondingly entitled, John C. Brewer application Ser. No. 07/909,038 filed Jul. 6, 1992 now U.S. Pat. No. 5,299,748.

BACKGROUND OF THE INVENTION

1. Field

The invention is in the field of usefully disposing of used vehicle tires by at least partially subjecting them to disintegration by cutting particles therefrom as an assembly of cutter blades is rotated against a rotating tire.

2. State of the Art

Many types of vehicle tire-cutting machines have been developed in the past for the purpose of so-called "shredding" of tires to be disintegrated. The most usual arrangements provide for feeding the tires between a rotating assembly of circular blades and a stationary assembly of heavy disks spaced apart to receive the blades and to provide anvils against which the tires are pressed by the rotating blades as they cut through the tire bodies, see my U.S. Pat. No. 3,578,252 issued May 11, 1971. However, these shredding machines cannot handle the very large and heavy tires used on various industrial vehicles.

The closest prior art known to applicant is Willette U.S. Pat. No. 3,693 894 of Sep. 26, 1972 entitled "Tire Shredder", wherein a number of tires to be shredded are arranged side-by-side on a tire holder having extendable and retractable hydraulic ram members radiating from a central hub and carrying respective longitudinal arms that extend transversely through the interiors of the several tires to collectively clamp against the circumferential beads thereof for holding the tires during the cutting operations, the length of such arms being dependent upon the number of tires held side-by-side on the tire holder which is rotated relative to a rotating assembly of elongate serrated blades, the longitudinal length of such blades also being dependent upon the number of tires held by the tire holder. This apparatus is incapable of handling the very large and heavy tires that have heretofore not been capable of being effectively disintegrated.

SUMMARY OF THE INVENTION

Accordingly, a principal objective in the making of the present invention was to provide a vehicle tire cutting machine capable of cutting tires used on very large industrial vehicles into easily handled particles.

In accordance with the invention, a highly versatile apparatus is provided for both holding and rotating a tire, or a unitary assembly of multiple sidewalls of tires whose tread portions have been cut, while a circular assembly of chisel-type cutter blades that project circumferentially from the assembly as a helically oriented series is rotated counter to and at a considerably higher speed than the tire. The machine slices out in chisel fashion particles of the tread of the tire inwardly thereof from the circumferential tread face of the tire, normally leaving only the beaded side walls of the tire for subsequent handling. However, in those instances in which the tire is recappable, cutting is stopped short of the reinforced body and sidewalls of the tire and progresses thereafter by replacement of the blade assembly with a row of wire buffing brushes to further prepare the tire for retreading.

Beaded side wall sections of the tire that are left following cutting through the tread and underlayment of the tire body are, in accordance with the invention, reinserted in the tire-holder part of the apparatus and held together, side-facings to side-facings. Operation of the apparatus thereupon slices such assembled beaded side wall portions of the tire into particles.

In contrast to the previously mentioned Willette apparatus, the apparatus of the present invention utilizes a unique combination of tire holder assembly and tire cutter blade assembly that is especially adapted to the effective handling, individually, of exceptionally large diameter and heavy tires that have very wide treads, such as are used on unusually large and heavy industrial trucks and other equipment and which have heretofore not been capable of being effectively disintegrated. However, the apparatus of the invention can also handle to good advantage the smaller tires customarily handled by presently available tire shredding machines.

A feature of the apparatus of the invention is the utilization, in the tire holder assembly, of a paired set of dual, radial, tire-holding jacks, each of the corresponding pair of jacks of the paired set of dual jacks being mounted by an elongate, rigid, tire bead clamping frame at opposite ends thereof and operative with respect to corresponding side wall beads of a received tire, so clamping pressure will be substantially equal on such beads and substantially equal along the length of such clamping frame with respect to the several single, residual, side walls of a side-by-side group of such residual beaded side walls when mounted together in the apparatus for cutting, and so that opposite ends of each of the opposite ends of such frame are spaced apart along a chord of the circumference of the corresponding bead of the received tire, whereby tires of various sizes can be readily handled by the apparatus. Such corresponding jacks of the paired set of dual jacks are preferably mounted in mutually spaced, side-by-side relationship in common by elongate arbor structure provided for endwise mating with motorized shaft components to make for rapid and convenient replacement, of one such arbor structure carrying the remains of a tire that has been cut, by another such arbor structure of the same or different size that has been preloaded with another tire to be cut in a sequential operating stage of the apparatus.

Another feature of the apparatus of the invention is the make-up of the rotary cutter blade assembly thereof, wherein a series of blade-holding disks are arranged and held rigidly side-by-side on a common shaft, each disk having a circumferential series of chisel-type blades projecting therefrom for slicing into and dislodging particles of rubber from the tread of a tire that is normally held and rotated relative to such cutter blade assembly, or from a similarly held and rotated, side-by-side assembly of beaded side wall members of tires from which the tread and underlayment portions have been cut. In the cutter blade assembly, the individual cutter blades are offset laterally from one another to form a helically oriented series of blades.

Since most vehicle tires, particularly excessively large ones, are now reinforced with strands of steel, it is one of the objects of the invention to provide for cutting such strands as well as the rubber as the cutting proceeds. For this purpose, a feature of the invention is the enclosing of a circumferential portion of the tire by a hood and injecting within such hood a freezing agent, such as liquid nitrogen, to provide a cryogenic environment for exposed surfaces of the tire as it is being cut. This superficially freezes the rubber and prevents it from springing away from the cutter blades and also superficially freezes the steel wires used as reinforcements.

The particles of rubber and steel cut from the tire are normally allowed to drop by gravity from the cutting zone onto the surface of an endless conveyor for discharge into a suitable collection chamber.

THE DRAWINGS

Embodiments of apparatus constituting what are presently regarded as the best modes of carrying out the invention in actual practice are illustrated in the accompanying drawings, in which.

DETAILED DESCRIPTION OF THE ILLUSTRATED EMBODIMENTS

Figure 1:
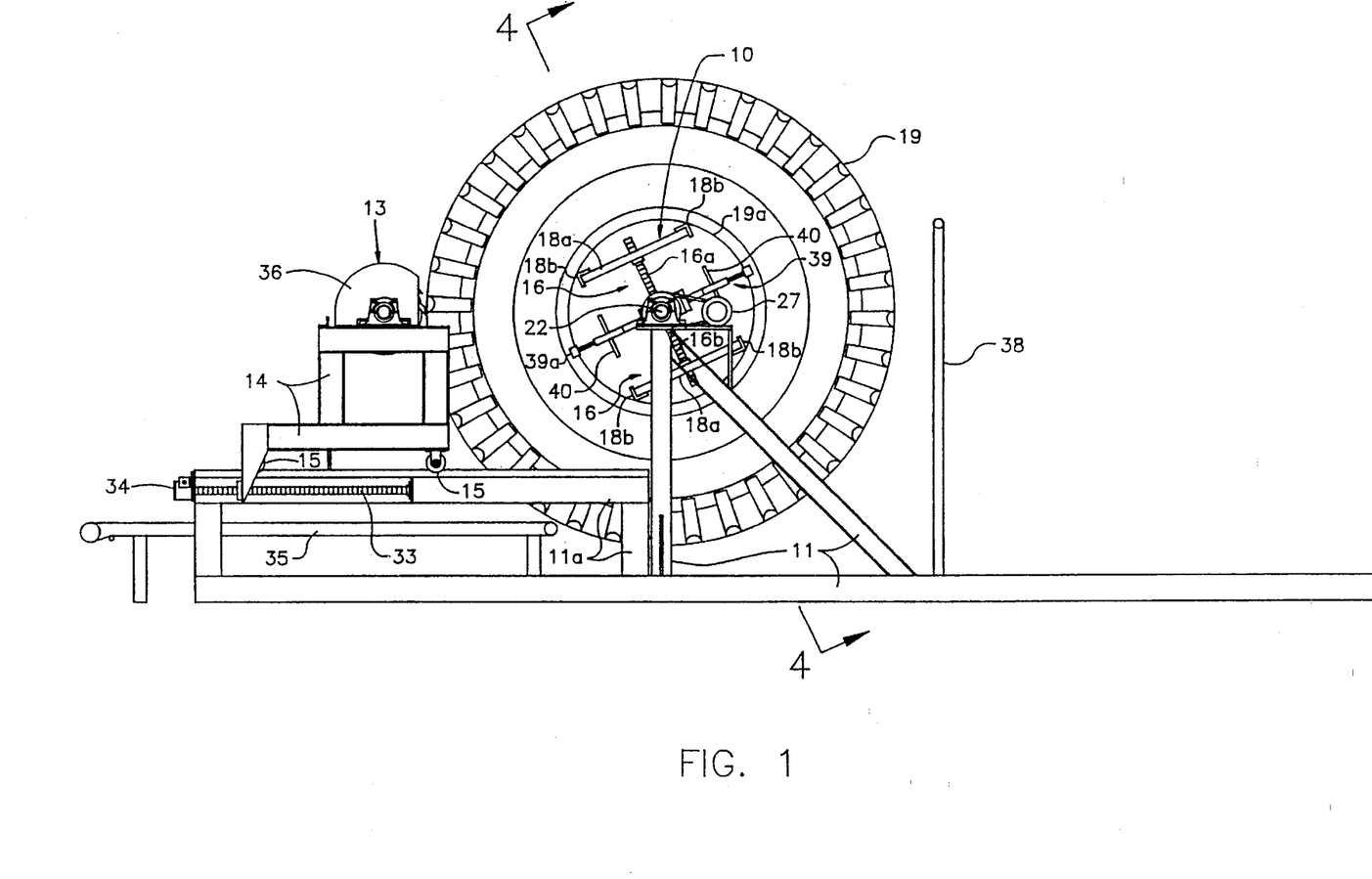
FIG. 1 is a view in side elevation of the apparatus shown as holding a tire to be cut.
Figure 2:
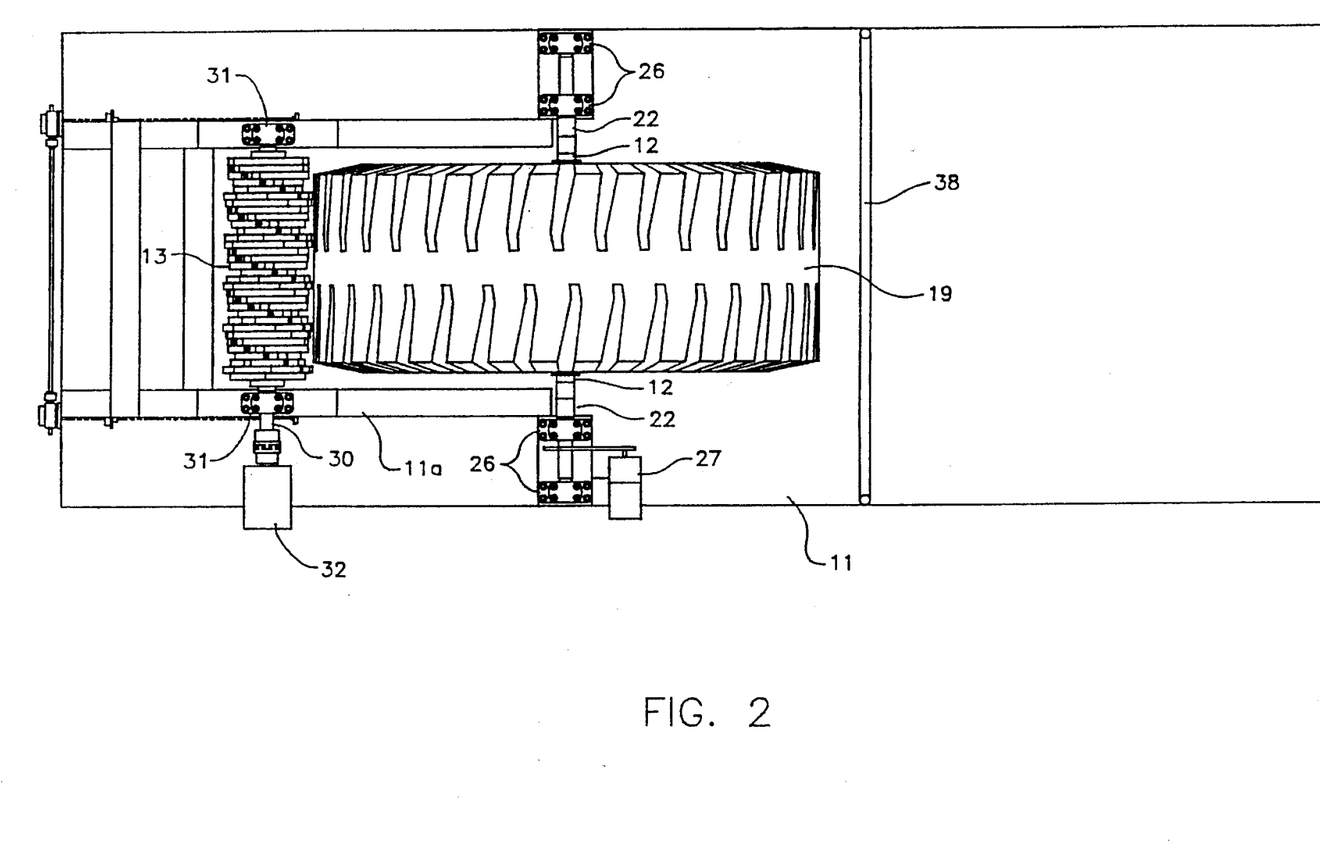
FIG. 2, a top plan view of the apparatus of FIG. 1.
Figure 4:
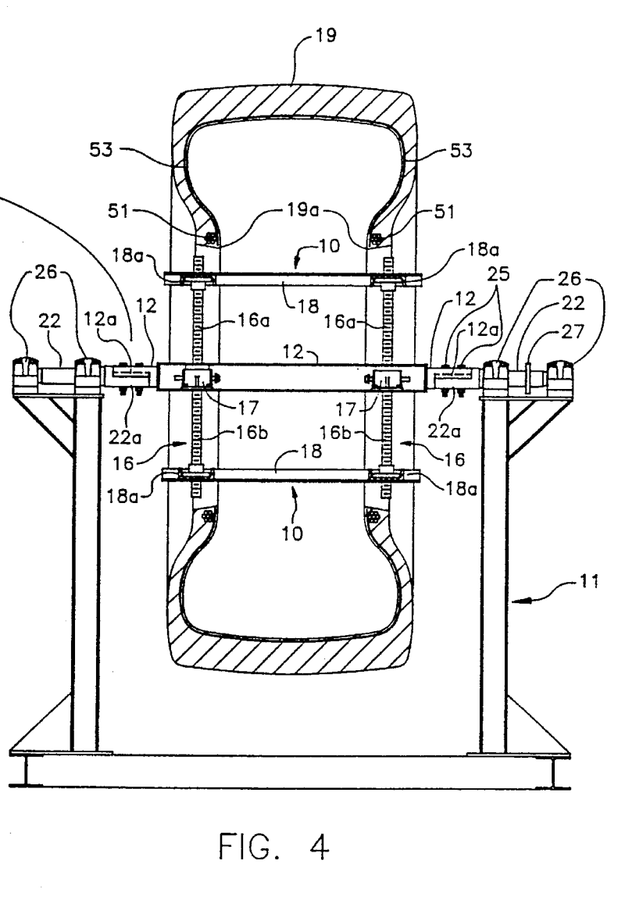
FIG. 4, a view in vertical section taken on the line 4—4 of FIG. 1 and drawn to a larger scale.

The embodiment of apparatus of the invention illustrated in FIGS. 1 to 16 comprises tire holding means in the form of a tire-holder assembly 10, FIGS. 1, 4, and 12–16, fixedly but rotatably mounted on a stationary frame 11 by means of an arbor structure 12, FIGS. 2 and 4, and tire cutting means in the form of a tire cutter assembly 13, FIG. 1, rotatably mounted on a sliding frame 14 arranged in this instance for extension toward and retraction away from the tire holder assembly 10. Sliding frame 14 has forward and rearward sets of wheels 15 arranged to move back and forth along a forward extension 11a of stationary frame 11.

Figure 12:
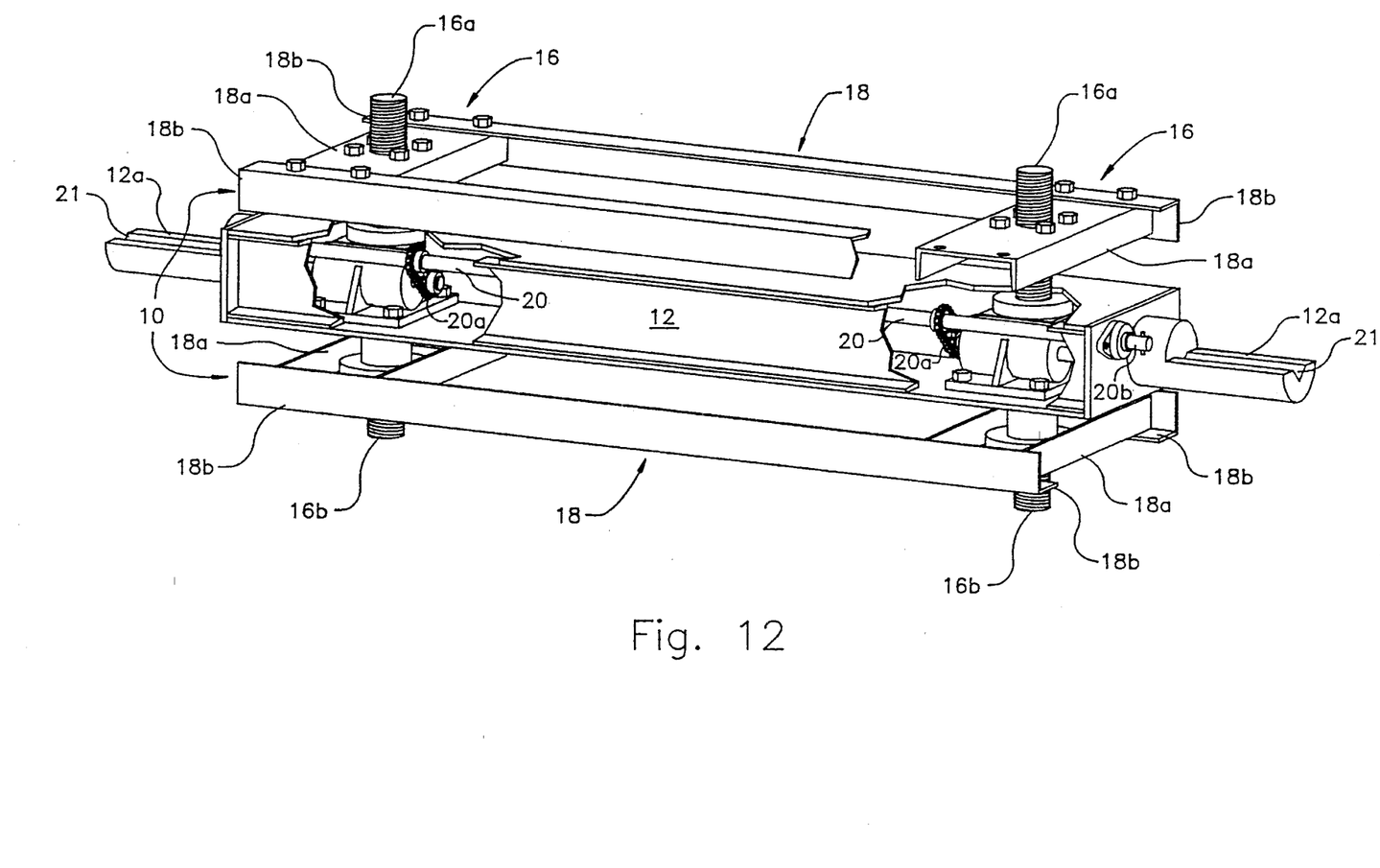
FIG. 12, a perspective view looking toward the front of the tire holder assembly part of the apparatus, sections of the supporting framework being broken away and the cutter blade assembly part of the apparatus not being shown, the view being drawn to a considerably larger scale.
Figure 15:
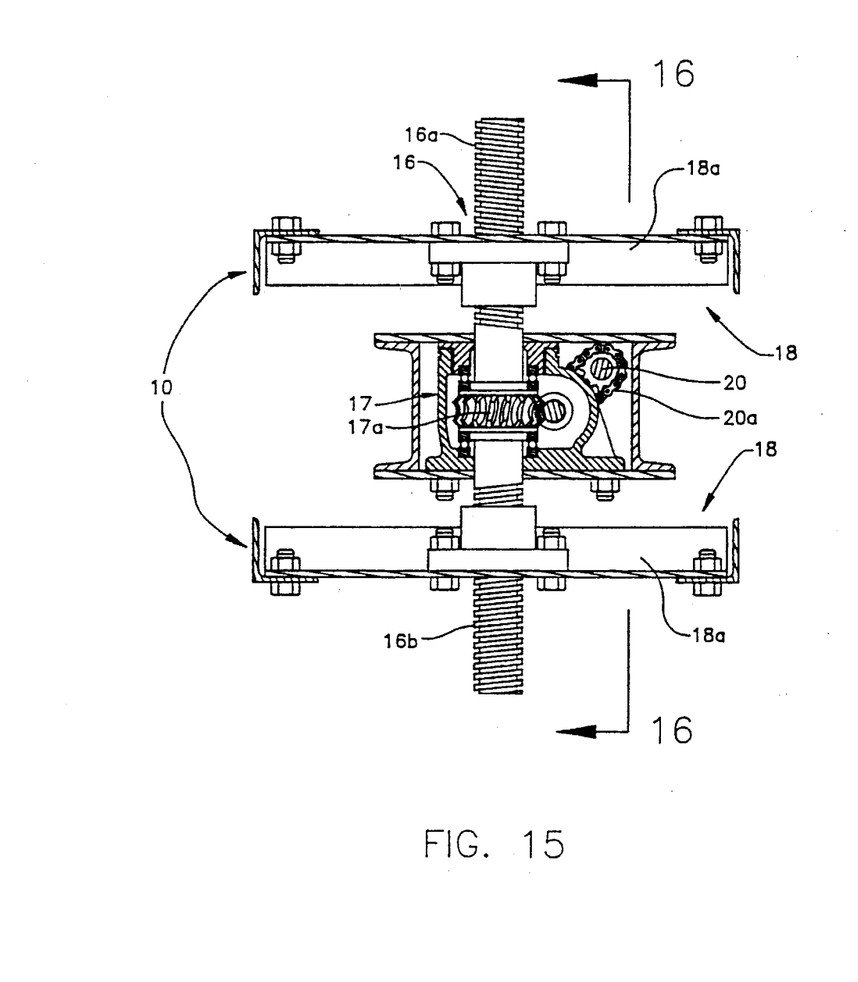
FIG. 15, a view in transverse axial vertical section taken on the line 15—15 of FIG. 13 through one of the dual jacks of the paired set of same of the tire holder assembly.
Figure 16:
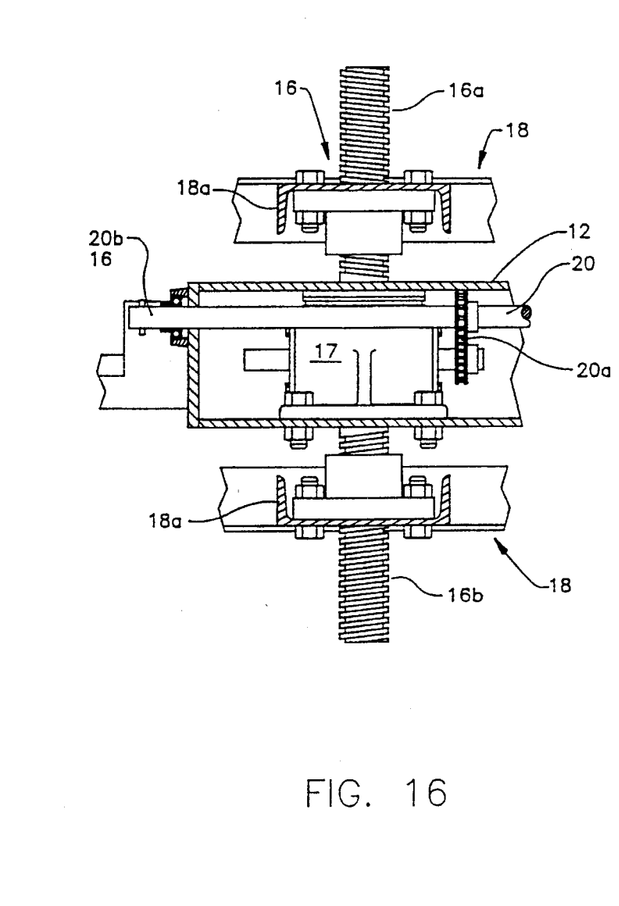
FIG. 16, a fragmentary view in longitudinal side elevation of the left-hand end portion of the portion of the tire holder assembly shown in FIG. 15.

Tire holder assembly 10 comprises a paired set of dual tire holding jacks 16, respectively, FIGS. 1 and 4, each of said dual jacks 16 extending oppositely from a corresponding jack-operating mechanism 17, which is of conventional construction insofar as a single jack that is commercially available (Joyce/Dayton Corp., Dayton, Ohio) for a variety of purposes is concerned, such conventional construction being altered for purposes of the invention by the provision of an additional jack arrangement extending oppositely from the operating mechanism 17 to provide the dual jacks operated in common by such mechanism by reason of a single shaft being threaded in opposite directions as illustrated in FIGS. 12, 15, and 16. Each of the mechanisms 17 has the usual gear 17a, FIG. 15, but here operates oppositely threaded, dual jack shaft portions 16a and 16b of the single shaft. When such single shaft is rotated in one way by the gear mechanism, the dual jacks of the paired set of same will all either be extended or retracted, and, when rotated in reverse, such dual jacks will all be actuated in reverse.

Figures 13, 14:
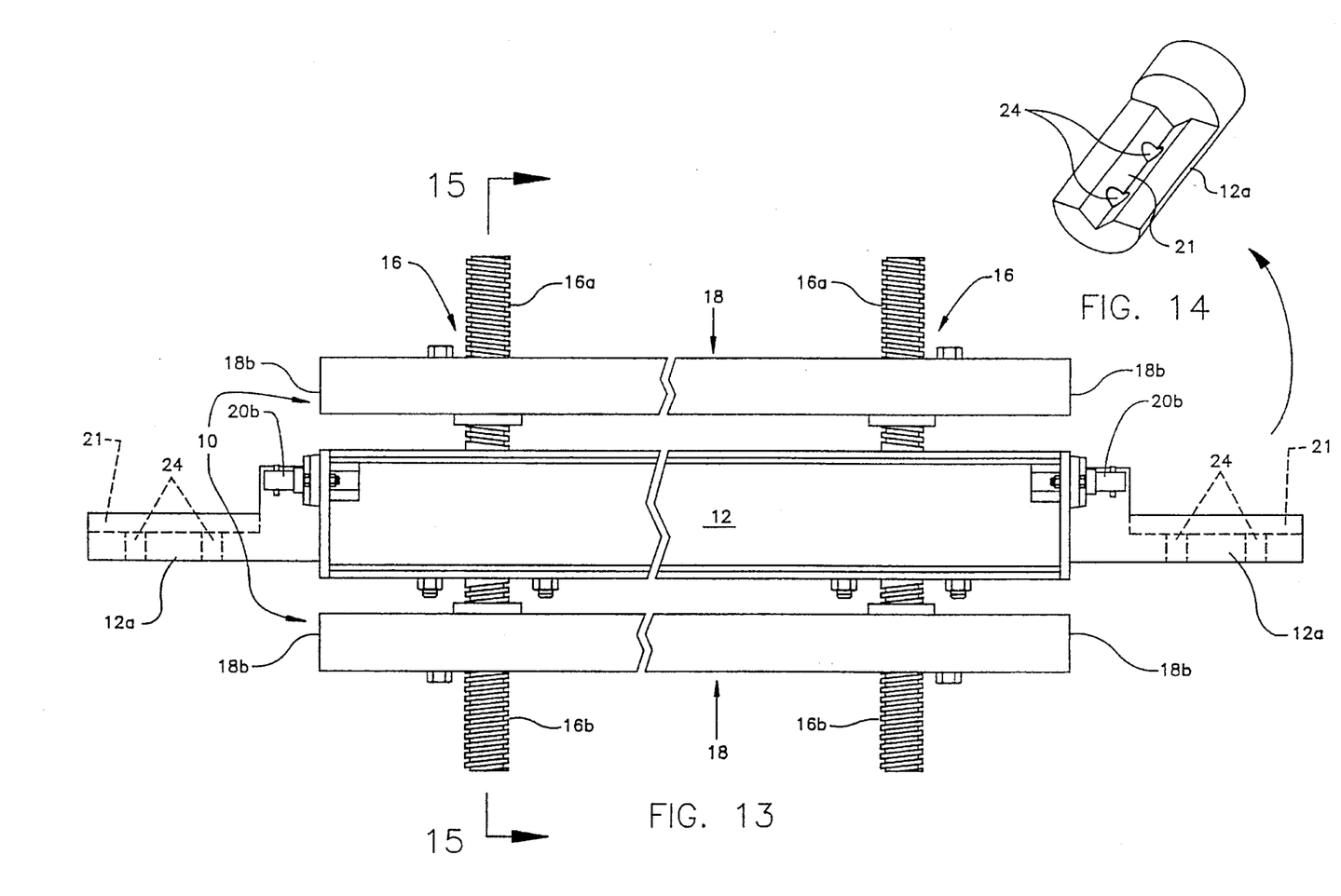
FIG. 13, a view in side elevation of the tire holder assembly looking toward the forefront of FIG. 12, an intermediate portion being broken out for convenience of illustration.
FIG. 14, a perspective view looking from above at that portion of FIG. 13 indicated by the arrow that extends between FIGS. 13 and 14.

Each of the jack shaft portions 16a and 16b of the single operating jack shaft of each of the dual tire holding jacks 16 of the paired set of same carries, threaded thereon through a suitable hub member, FIGS. 15 and 16, an end piece 18a of a corresponding, elongate, rigid, and preferably rectangular clamping frame 18, FIGS. 12 and 13, which has longitudinal side members 18b, respectively, for spanning the distance along the inside width of a received tire 19 between the component beads 19a of the tire, see FIG. 4, and constitute tire bead clamping means. Opposite ends or corners (indicated by 18b as applied in FIGS. 1, 12, and 13) of opposite ends of frame 18 adjacent to frame end pieces 18a are mutually spaced apart by a distance that spans a chord of a corresponding circular bead 19a, FIG. 1, of a received tire 19 to be cut. The total length of such frame 18 between the bead-clamping opposite ends thereof is such as to span the inside width of the tire, i.e., the distance between the inside circumferences of the component side wall beads of the tire, see FIG. 4, which means that grouped, residual, side wall portions 19-1, FIG. 19, of cut tires have their beads clamped by the longitudinal side members 18b of rigid frame 18 along their lengths when placed in tire holder assembly 10. The geometric shape of the frame 18 in any given instance will depend on the size of the tire to be held thereby, for example, the frame may be square instead of elongate in one direction or the other.

The dual jacks 16 of the paired set of same are rigidly held in longitudinally spaced apart relationship by the mechanisms 17, FIG. 4, which are within an elongate housing formed by the journal structure 12. Such housing extends axially through the holder-mounted tire 19 and protectively houses such mechanisms 17 of the respective dual jacks 16. The rigid frames 18 also extend through the circular interior of the holder-mounted tire so that the corners 18b, FIGS. 1 and 4, of their respective ends contact the corresponding beads of the tire at the ends of the chords spanned by such frame ends. This means that not only can the dual jacks immediately fit any size tire, but, also, that centering of any received tire relative to the shaft of the arbor structure 12 is automatic.

Mechanisms 17 of the respective dual jacks 16 of the paired set of same are operatively interconnected by a shaft 20, FIG. 12, and by respective sprocket assemblies 20a. Opposite ends 20b of shaft 20 project exteriorly of arbor housing structure 12 for receiving a handcrank or electric impact wrench (not shown) at such times as the dual jacks 16 are to be either extended or retracted relative to the corresponding beads 19a of a holder-mounted tire 19.

Figure 5:
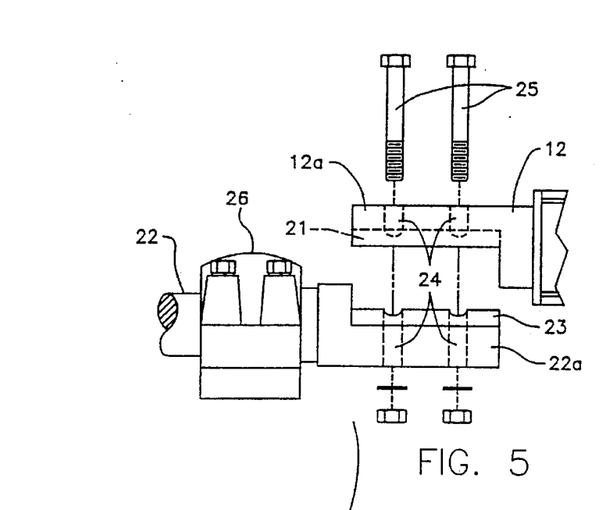
FIG. 5, an exploded, fragmentary portion of FIG. 4 that is indicated by the arrow extending between FIGS. 4 and 5, the view being drawn toga larger scale.
Figure 6:
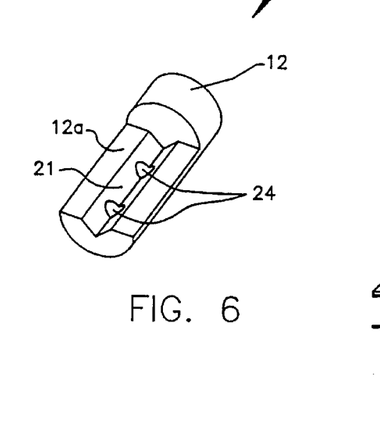
FIGS. 6 and 7, bottom and top perspective views, respectively, of the mating shaft ends of FIG. 5 that are indicated by the arrows extending between FIGS. 5 and 6 and between FIGS. 5 and 7, respectively.
Figure 7:
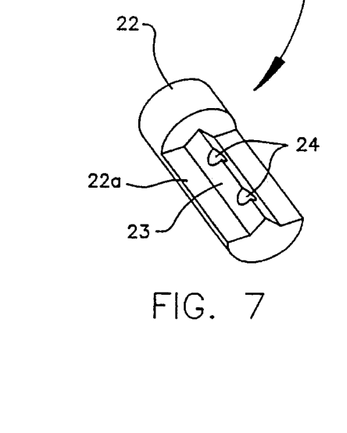
Figure 8:
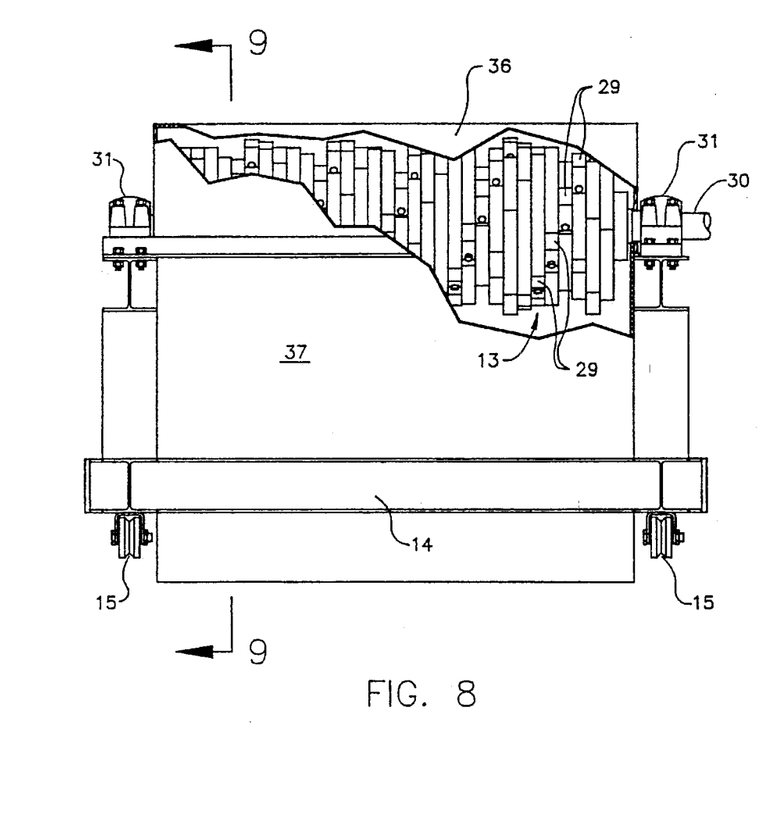
FIG. 8, a view in elevation, partly broken away, of an upper portion of the front end of the apparatus of FIGS. 1 and 2 showing part of the cutter blade assembly, the tire in the background not being shown.

In accordance with the invention, the tire holder assembly is preferably constructed for quick and easy replacement by others that are either sized, respectively, to handle various other desired tire sizes or that are merely preloaded with another tire to be sequentially operated on. For this purpose, the opposite ends of the shaft of arbor 12 of tire holder assembly 10 are configured as partial stub shafts for endwise mating with matingly configured portions of motorized shaft components. As illustrated, it is preferred to have such opposite stub shaft ends of arbor 12 semi-circular in formation, see 12a, FIGS. 5 and 8, with a longitudinally extending V-formation 21, here shown as a valley, for receiving respective matingly-formed ends 22a, FIGS. 5 and 7, of a motorized shaft 22, FIG. 2, that is provided with a gap along its length for receiving such arbor structure 12. The mating V-formations 23 of the respective ends 22a are, in this instance, V-ridges adapted to fit into the respective V-valleys 21. Longitudinally spaced, transverse holes 24 are provided through the mating journal and motorized shaft ends 12a and 22a, respectively, to receive bolts 25, FIG. 5, in the mated condition thereof. Motorized shaft 22 is journaled in bearings 26 and provided with a motor drive 27, FIGS. 1, 2, and 4.

Although the above form of apparatus provided with mating stub shafts for quick and easy connection to corresponding, matingly-formed ends of corresponding shaft portions 22 is preferred, the stub shafts protruding from opposite ends of arbor 12 can be elongated to themselves take the place of such shaft portions 22, or the housing portion of the arbor can be a motor driven shaft throughout, with mechanisms 17 suitably interposed intermediate its length.

Figure 3:
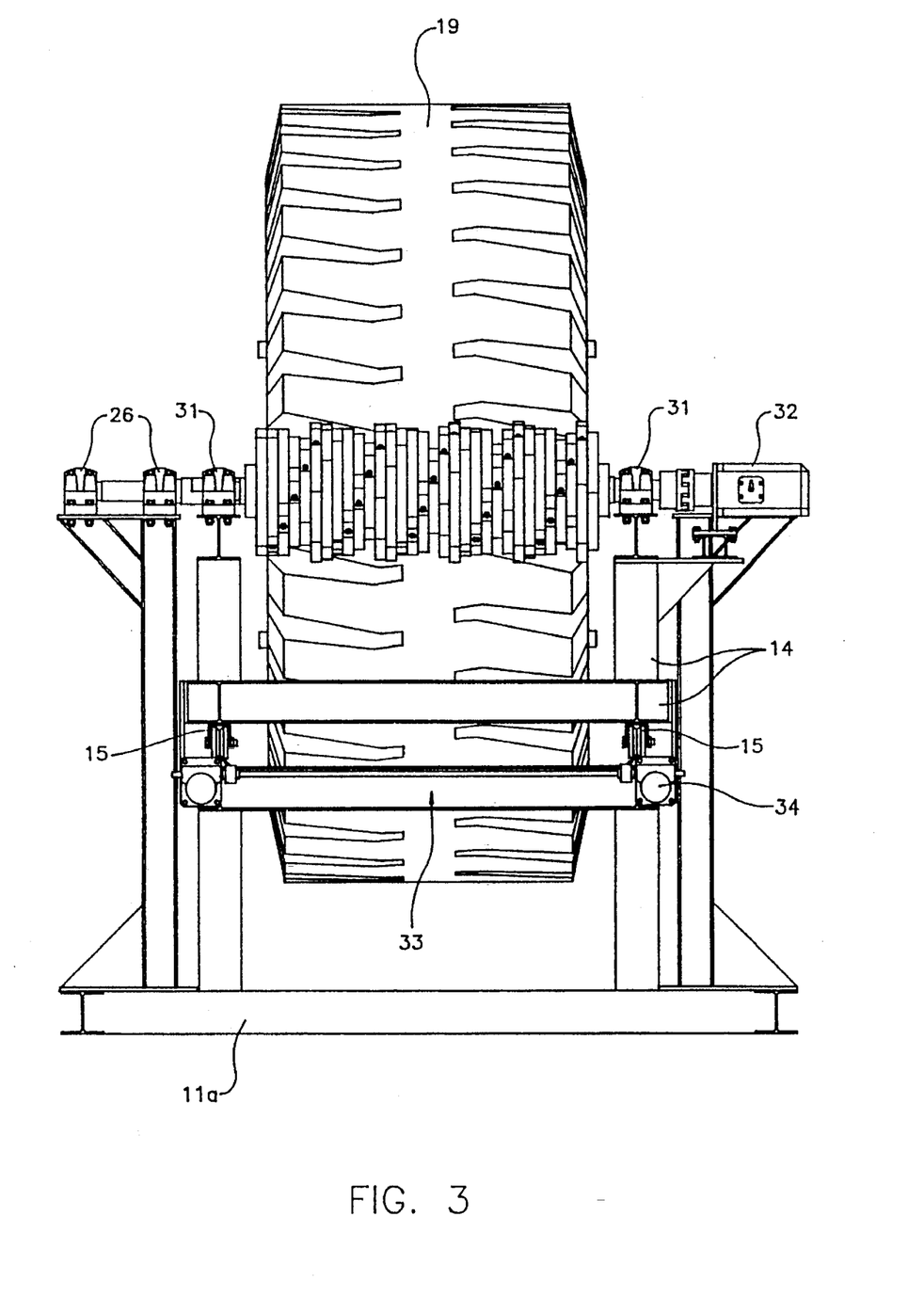
FIG. 3, a view in elevation of the front end of the apparatus of FIGS. 1 and 2 as viewed from the left thereof and drawn to a somewhat larger scale.
Figure 9:
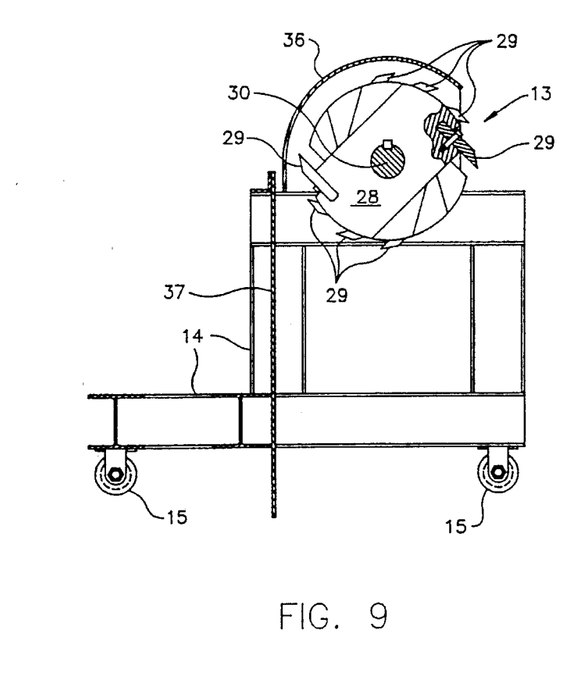
FIG. 9, a view in vertical section taken on the line 9—9 of FIG. 8, a portion of the cutter blade assembly being shown in vertical section.
Figure 10:
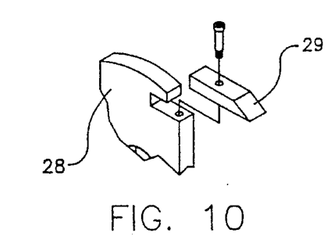
FIG. 10, an exploded fragmentary view in perspective of the portion of the cutter assembly that is shown in vertical section in FIG. 9.
Figure 11:
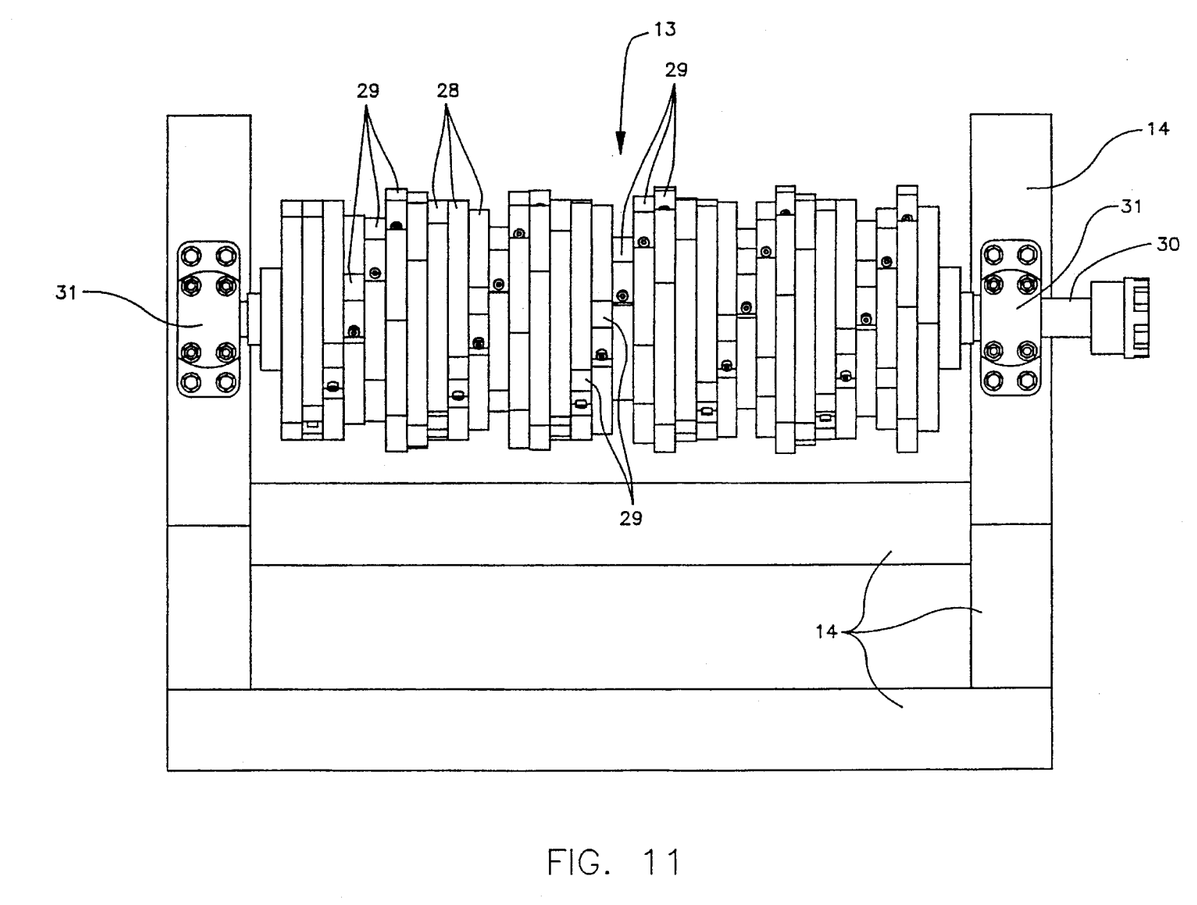
FIG. 11, a top plan view of the cutter assembly part of the apparatus and of the frame mounting therefor as shown in FIG. 9 but drawn to a larger scale, the protective hood having been removed.

The tire cutter assembly 13 is constructed and arranged to slice particles, usually of a size approximately two inches by two inches (approximately five centimeters by five centimeters) in area by one-quarter of an inch (approximately 0.635 centimeters) in depth, from the tread of a very large tire, as at 19, typically 150 inches (3.81 meters) in diameter. It is made up of a side-by-side series of partially circular cutter plates 28, FIGS. 2, 3, and 8–11, each having one or more, but usually a pair, as shown, of diametrically disposed blades 29 of chisel formation projecting from its periphery, see particularly FIGS. 9, 10, and 11, the several blades of the series of plates 28 being offset laterally from one another about the rotational axis of the assembly 13 so as to form, in effect, a helically oriented series of such chisel blades along the width of the tread of a tire being worked on. As here shown, the cutter plates 28 are keyed to a shaft 30 in common, which shaft is journaled in bearings 31 and driven by a motor 32, FIG. 2. Assembly 13 is mounted on frame 14 for movement along frame extension 11a toward and away from a tire (19) held by tire-holder assembly 10. Movement toward and away from the tire is effected manually by mechanically turning a screw mechanism 33, FIGS. 1 and 3, by means of a motor 34.

Tire holder assembly 10, with a tire mounted thereon, is rotated differentially as to speed relative to tire cutter assembly 13, the speed differential being typically 3 to 12 RPM for the former and 1200 RPM for the latter. Particles sliced from the tread of the tire, or from the beaded sidewall portions thereof, see 19-1, FIG. 19, as separately mounted and held by the holder assembly 10, fall onto a conveyor belt 35, FIG. 1, for transport to a suitable collecting zone. For safety purposes, it is desirable to provide a hood 36 and a drop curtain 37 for the cutter assembly 13, see especially FIGS. 8 and 9, and a back drop 38, FIG. 1, for the tire holder assembly.

Figure 17:
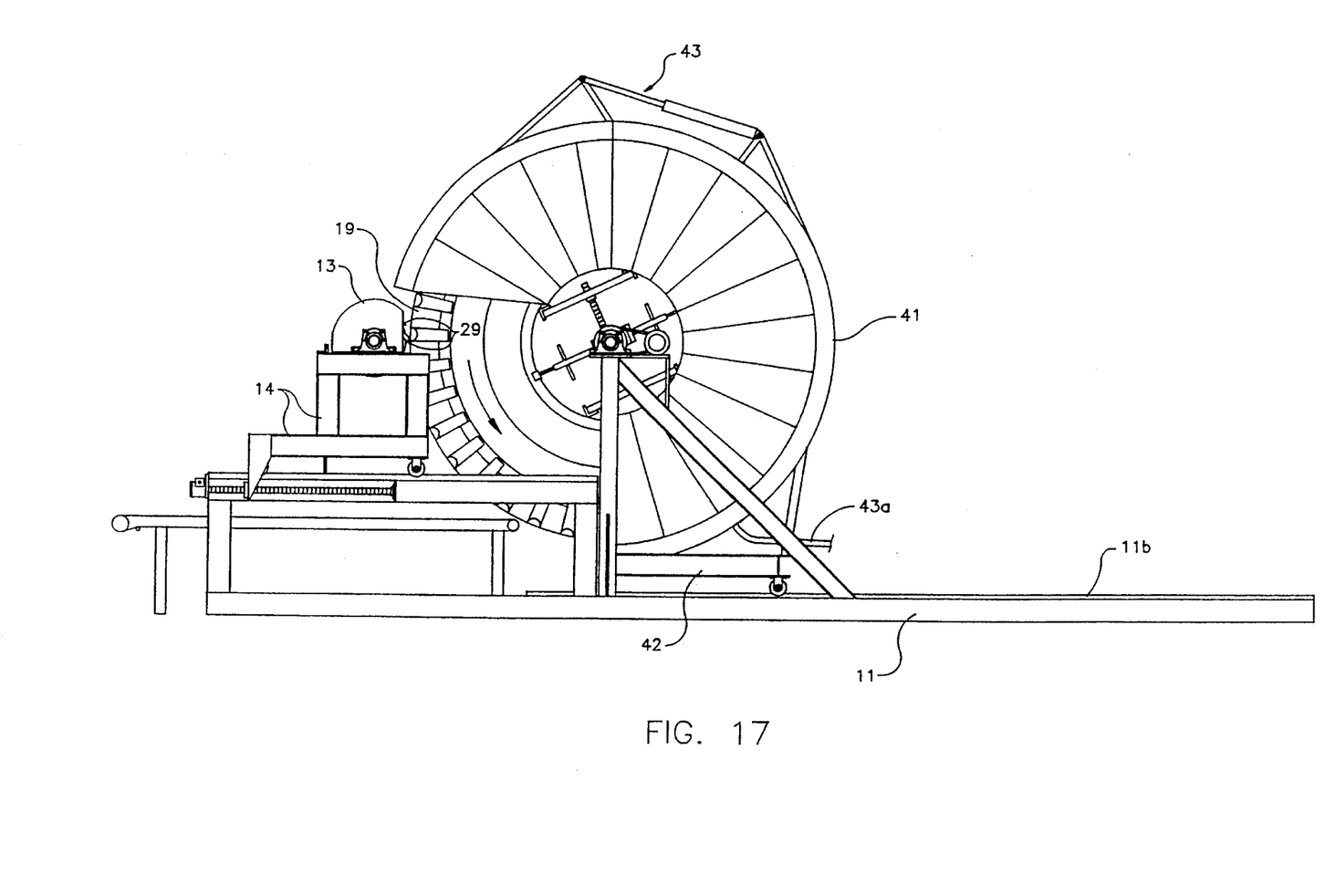
FIG. 17, a view corresponding to that of FIG. 1 but showing a cryogenic embodiment of the apparatus which is equipped with a hood under which liquid nitrogen or similar freezing agent is injected.
Figure 18:
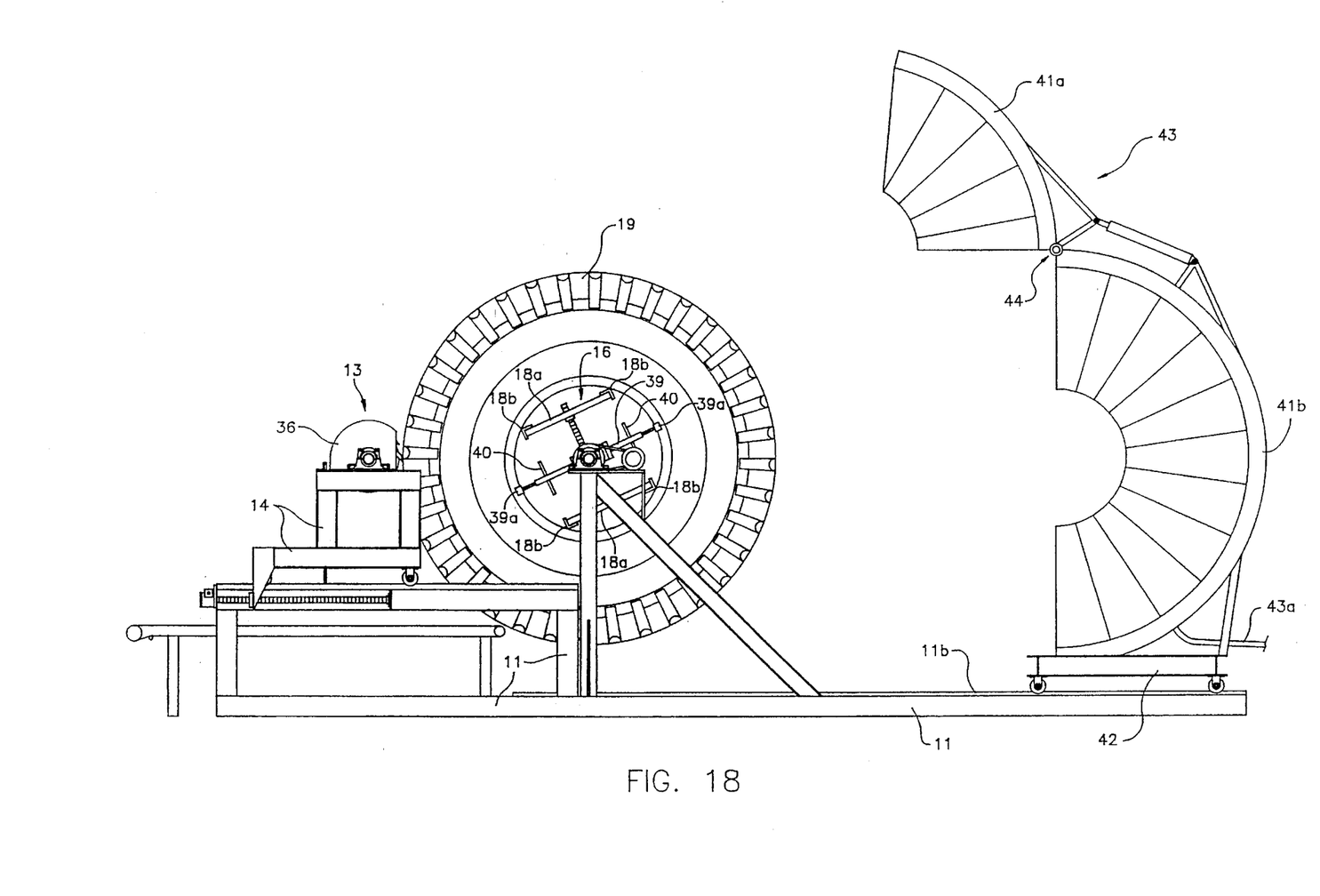
FIG. 18, a view corresponding to that of FIG. 17, but showing how the hood can be drawn backwardly away from the remainder of the apparatus when the cryogenic feature is not required for a particular operation.

It is advantageous to provide an additional pair of dual jacks 39, FIGS. 1, 17, and 18, for positioning diametrically across the interior of a tire held by the tire holder assembly 10 of the apparatus, the same extending normal to and across the corresponding dual jacks 16 and usually being manually operable, as by means of handle mechanisms indicated schematically at 40, or by electric impact wrenches, so their tire bead contacting members 39a can be extended and retracted at will.

The embodiment of apparatus shown in FIGS. 17 and 18 is cryogenic in the sense that the tire is subjected to deep freezing while being cut. In the form illustrated, an approximately three-quarters circular, i.e. 135°, hood 41 is mounted on a wheeled carriage 42, that is supported by the rearwardly extending portion 11b of frame 11 of the apparatus of FIG. 1, so as to be movable over and away from the tire holder assembly 10 and tire cutter assembly 13 of FIG. 1. Articulated piping 43 leading into hood 41 at spaced locations from a source 43a of a freezing agent, such as liquid nitrogen, supplies such freezing agent to the tire rotating under the hood as indicated by the applied arrows in FIG. 17, so as to superficially freeze not only the rubber tread portion, to prevent slipping of the rubber away from the cutter blades, but also the steel reinforcements bridging and extending along the side wall portions of the tire to make them susceptible to shattering when contacted by the slicing blades 29, see also FIGS. 9 and 10, of the cutter assembly 13.

As shown in FIG. 18, the hood 41 is advantageously hinged, as at 44, so the forward, overlying, quarter portion 41a can be swung upwardly and rearwardly relatively to the rearward semi-circular portion 41b for installing and removing the hood by manually pushing carriage 42 forwardly and rearwardly, respectively, relative to the remainder of the apparatus.

Figure 20:
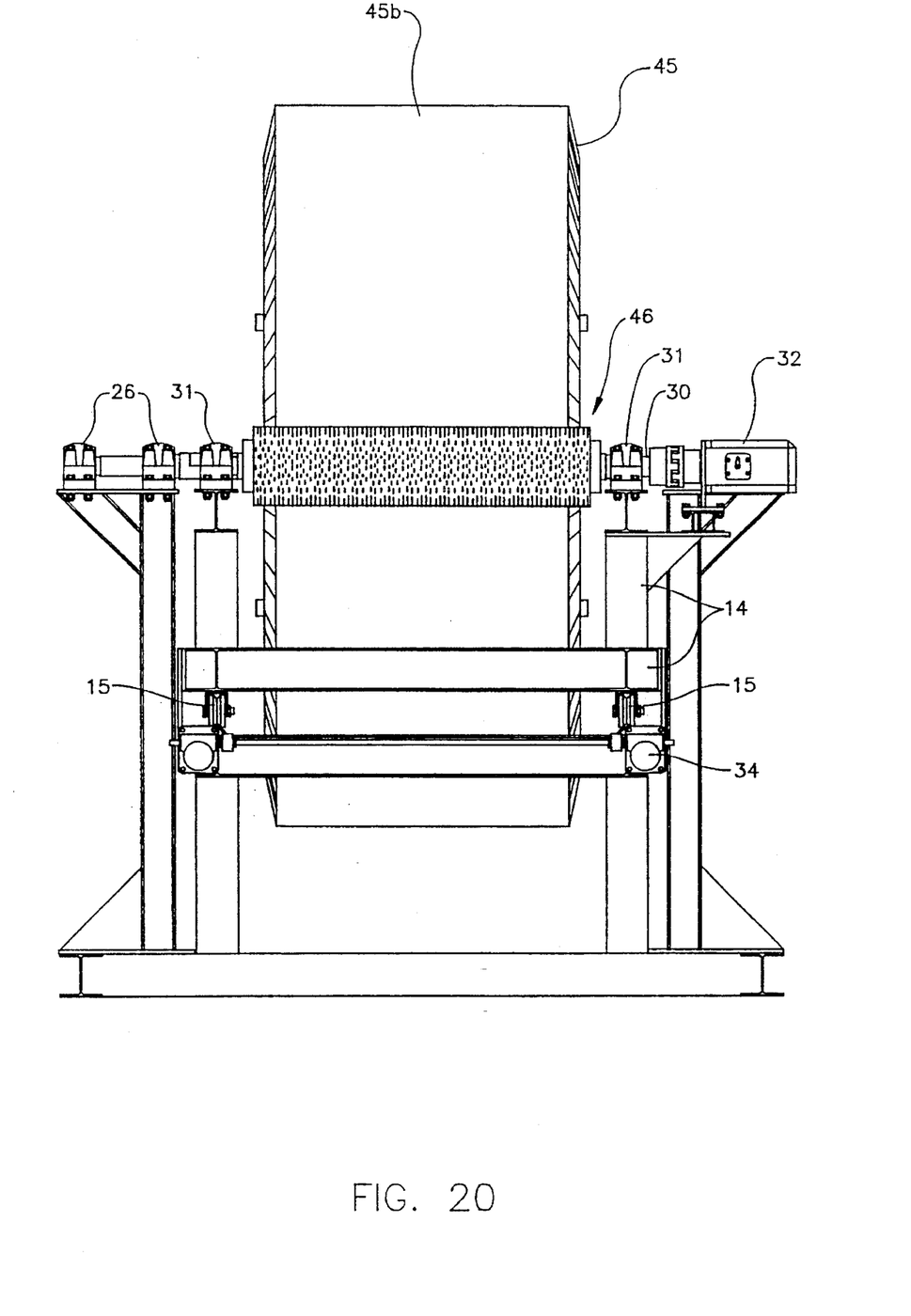
FIG. 20, a view corresponding to that of FIG. 3 but showing a wire brush and buffer assembly substituted for the cutter blade assembly.
Figure 21:
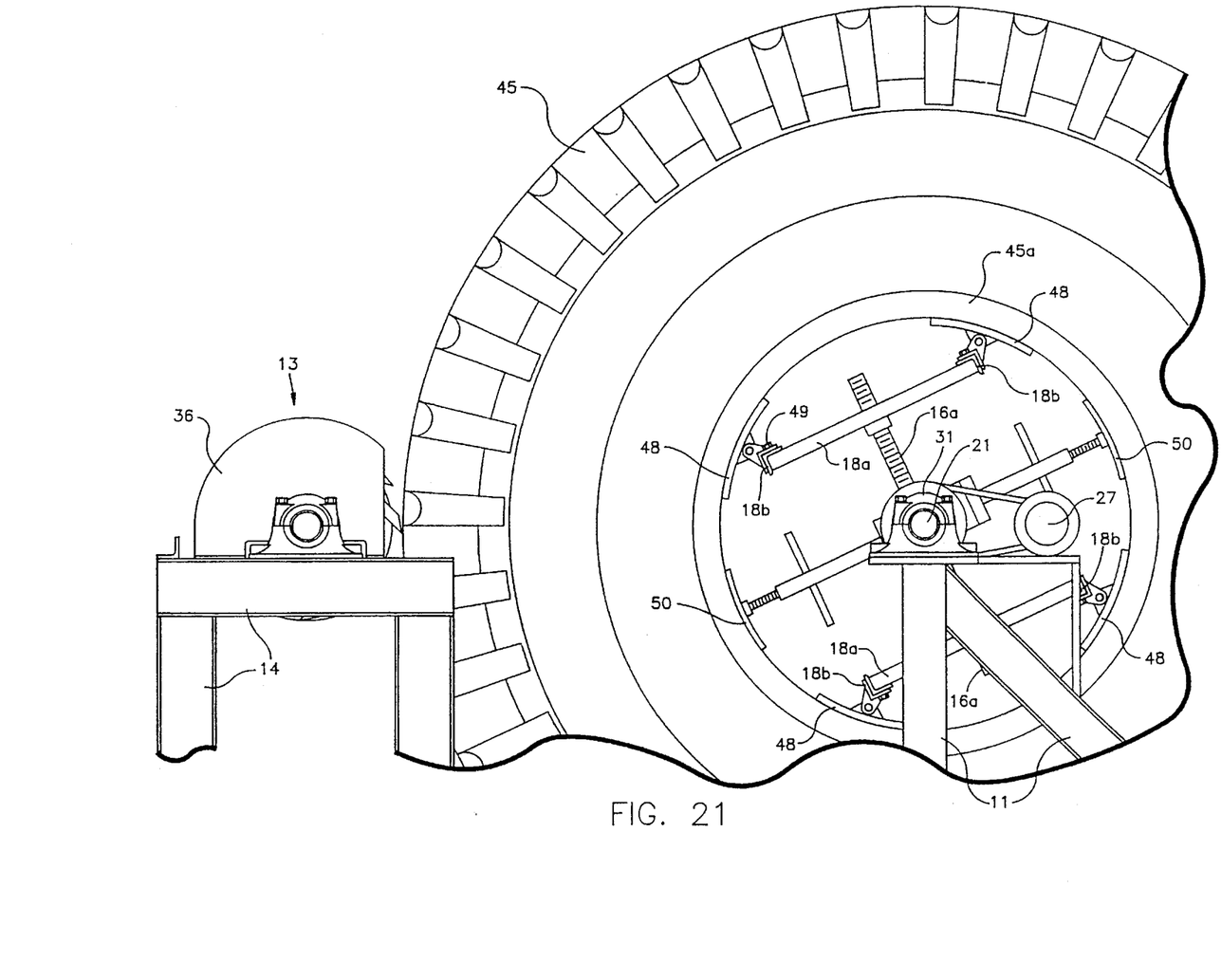
FIG. 21, a view corresponding to a portion of FIG. 1 but taken with respect to the embodiment of FIG. 20 and showing how bead-shape-retaining attachments are applied to the parts of the tire holding assembly that contact the beads of a recappable tire being held for tread slicing and buffing.

In working on tires that are recappable, following the initial slicing of the tread portion of such a tire 45, FIGS. 20 and 21, the tire cutter assembly 13 is replaced by a wire brush and buffer assembly 46 following initial slicing of the tread portion. Assembly 46 comprises a usual type of elongate cylindrical wire brush 46a rigidly mounted on a shaft 47 corresponding to the shaft 30 that is journaled in the bearings 31 and driven by the motor 32.

Since the tire 45 is to be remounted on the usual receiving rim of the wheel, care is taken to preserve the integrity and true circular formation of the mounting beads 45a, FIG. 21, of the tire during both the slicing of particles from the tread and the buffing of the residual cut surface 45b, FIG. 20. For this purpose, the bead-contacting corners or opposite ends of the longitudinal frame members 18b of tire clamping frames 18 have properly curved, bead-conforming, elongate, bead-contacting attachments 48, FIG. 21, temporarily attached thereto as by means of bolts 49, while the members 39a of the pair of dual jacks 39, as here manually operated, have their bead-contacting ends properly curved in conformity with bead curvature by bead-contacting attachments 50.

In using the illustrated apparatus of the invention, the arbor structure with its set of tire-holding dual jacks is installed in the tire prior to mounting such arbor structure between the spaced apart ends 22a, FIG. 4, of motorized shaft 22, whereby the shaft 12 of such arbor structure will be automatically centered relative to the tire. Also, in this way the supporting portion of the apparatus always stands ready to receive another arbor-structure-mounted tire in the sequential cutting of a supply of tires to be operated on, and, as previously mentioned, by reason of the unique manner in which the tire clamping members engage the beads of the tire, a single size arbor structure can fit various differently sized tires within the same general size range. Moreover, since the mutually spaced, tire clamping members 18b of the frames 18 are not confined to the ends of the frames, but continue throughout the lengths of such frames, bridging the space between side wall beads 19a or 45a of the tire being worked on, the same arbor structure can be employed for clamping several of the separate, residual sidewall portions 19-1, FIG. 19, of sequentially cut tires in close side-by-side relationship for further cutting down to the tire beads 45a, whereupon such tire beads are sawed or otherwise cut traversely through the heavy steel reinforcing cables 51 therein.

Figure 19:
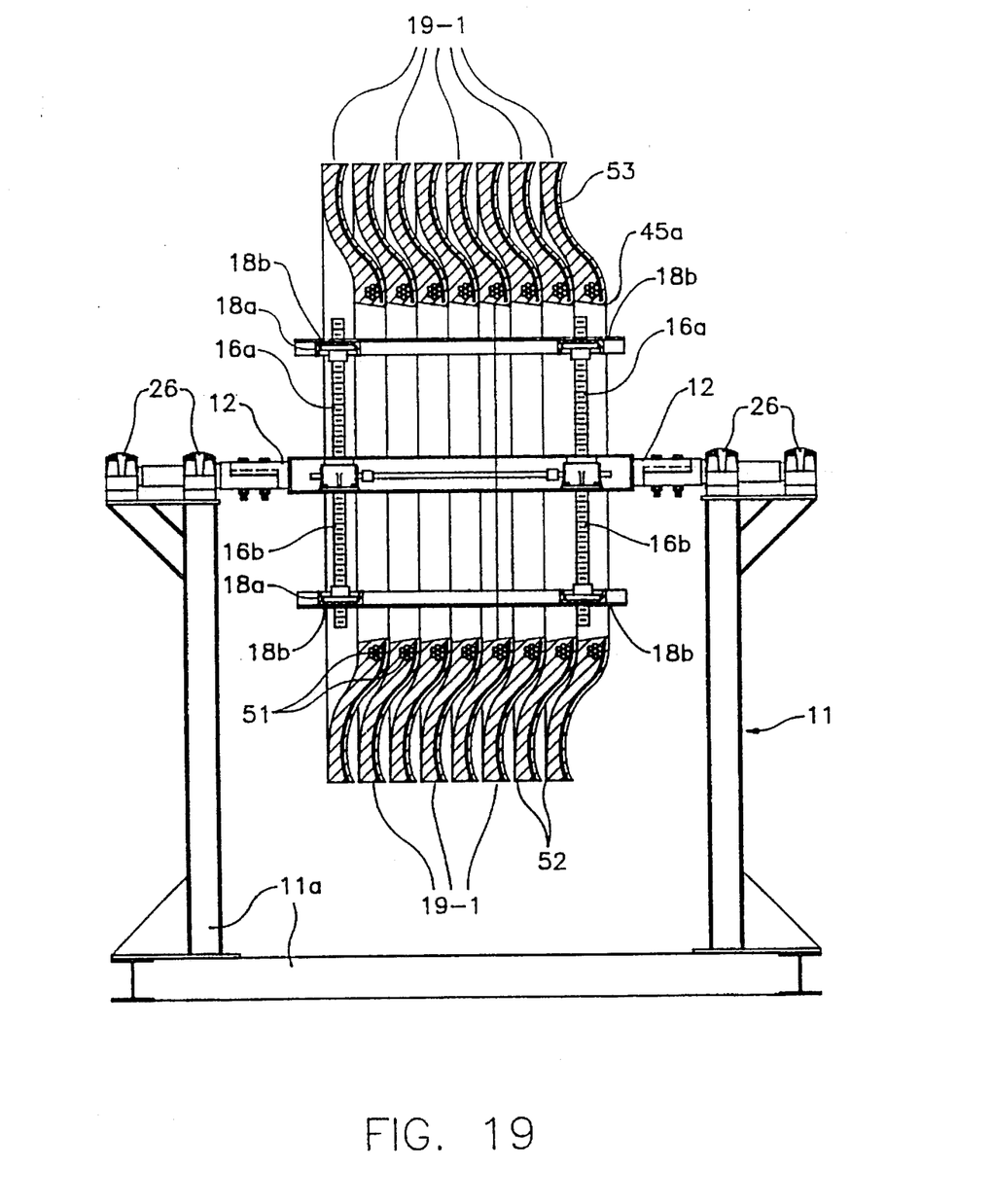
FIG. 19, a view corresponding to that of FIG. 4 but showing how the residual, beaded, side wall portions of tires sliced by the apparatus are themselves held for being sliced by the apparatus.

Such separate, residual side wall portions 19-1 are desirably placed together in nested arrangement, as shown, so there will be spaces 52 between their outer peripheries for penetration of the cryogenic atmosphere therebetween to aid the cutting of side wall reinforcing wires 53, FIGS. 4 and 19.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method of cutting particles from discarded vehicle tires using cutter apparatus, comprising the steps of progressively cutting through the tread portions of such vehicle tires taken from a supply of same and worked on sequentially as each is rotated, leaving as residual, separate, beaded side wall portions of said tires worked on sequentially; grouping said separate, residual, beaded side wall portions of said tires face-to-face in nested relationship in a rotatable tire-holder with the tread ends thereof outermost; rotating said tire-holder; and using said cutter apparatus to cut the side wall parts of said separate side wall portions of the tires down to the beads thereof.

2. A method in accordance with claim 1, wherein the progressive cutting of each tire is carried out in a cryogenic atmosphere that freezes exposed surfaces of the tire as the cutting proceeds.

3. A method in accordance with claim 2, wherein the separate, residual, beaded side wall tire portions are nested in the tire-holder assembly of the apparatus so the tread end parts of said side wall portions are spaced apart to provide for passage of the cryogenic atmosphere inwardly of the so-grouped side wall tire portions.

4. A method in accordance with claim 1 wherein the tire beads are subsequently cut transversely thereof.

5. A method in accordance with claim 4, wherein the cutting of the tire beads is carried out by sawing.

6. A method of cutting particles from a discarded vehicle tire having beaded side wall portions, comprising mounting a vehicle tire for rotation in rotatable tire-holding apparatus; rotating said apparatus; cutting particles from the tread portion of the so-mounted tire, grouping the beaded side wall portions of said tire face-to-face in nested relationship in said apparatus; and holding said side wall portions together in said apparatus while rotating said apparatus and cutting particles from said side wall portions.

\* \* \* \* \*